US012481470B2

(12) United States Patent
Kim et al.

(10) Patent No.: US 12,481,470 B2
(45) Date of Patent: Nov. 25, 2025

(54) MULTI-DISPLAY DEVICE AND IMAGE DISPLAY CONTROL METHOD OF SAME

(71) Applicant: SAMSUNG ELECTRONICS CO., LTD., Suwon-si (KR)

(72) Inventors: Sejun Kim, Suwon-si (KR); Kibo Kim, Suwon-si (KR); Jinsub Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/425,638

(22) Filed: Jan. 29, 2024

(65) Prior Publication Data
US 2024/0168693 A1 May 23, 2024

Related U.S. Application Data

(63) Continuation of application No. PCT/KR2022/009609, filed on Jul. 4, 2022.

(30) Foreign Application Priority Data

Sep. 1, 2021 (KR) .................. 10-2021-0116176

(51) Int. Cl.
G06F 3/14 (2006.01)
(52) U.S. Cl.
CPC ................... G06F 3/1446 (2013.01)
(58) Field of Classification Search
CPC .................................................. G06F 3/1446
See application file for complete search history.

(56) References Cited

U.S. PATENT DOCUMENTS 6,411,302 B1* 6/2002 Chiraz .................. G09G 5/024
345/545
6,999,045 B2* 2/2006 Cok ...................... G06F 3/1446
345/1.3
7,138,991 B2 11/2006 Tsuji
(Continued)

FOREIGN PATENT DOCUMENTS

CN 1331071 C 8/2007
CN 103377021 A 10/2013
(Continued)

OTHER PUBLICATIONS

International Search Report (PCT/ISA/210) issued on Sep. 30, 2022 by the International Searching Authority in International Patent Application No. PCT/KR2022/009609.
(Continued)

Primary Examiner — Ariel A Balaoing
(74) Attorney, Agent, or Firm — Sughrue Mion, PLLC

(57) ABSTRACT

A multi-display device is configured to display an image, and the multi-display device includes display modules sequentially connected according to a prescribed connection configuration. Each of the display modules may include a signal input unit for acquiring an image signal and control information and a partial image selection unit for obtaining, from the control information, information about the connection configuration of the display modules, wherein each display module selects a partial image corresponding to the display module, from the image signal by referring to a first lookup table based on the information about the connection configuration.

13 Claims, 9 Drawing Sheets

(56) References Cited

U.S. PATENT DOCUMENTS

| | | |
|---|---|---|
| 7,489,323 B2 | 2/2009 | Yang et al. |
| 8,081,140 B2 | 12/2011 | Jung |
| 8,427,391 B2 | 4/2013 | Perkins et al. |
| 9,240,145 B2 | 1/2016 | Ichioka et al. |
| 9,367,890 B2* | 6/2016 | Choi .................... G09G 5/00 |
| 9,392,239 B2 | 7/2016 | Asamura et al. |
| 9,966,043 B2 | 5/2018 | Kaneko |
| 10,235,964 B2 | 3/2019 | Zhang |
| 10,268,435 B2 | 4/2019 | Terao |
| 10,671,207 B2 | 6/2020 | Park et al. |
| 10,691,394 B2* | 6/2020 | Hirai ................ H04N 21/242 |
| 11,055,052 B2 | 7/2021 | Seo et al. |
| 2005/0134525 A1* | 6/2005 | Tanghe ............... G06F 3/1446 |
| | | 345/1.1 |
| 2006/0161948 A1* | 7/2006 | Hwa ................ H04N 21/4108 |
| | | 725/38 |
| 2013/0322783 A1 | 12/2013 | Kang |
| 2014/0016709 A1* | 1/2014 | Ko ...................... H04N 7/0125 |
| | | 348/441 |
| 2014/0036058 A1* | 2/2014 | Takahashi ............ G06T 3/4038 |
| | | 348/80 |
| 2016/0104455 A1 | 4/2016 | Chiu et al. |
| 2016/0266859 A1* | 9/2016 | Akatsuka ............. G06F 3/1446 |
| 2018/0061298 A1* | 3/2018 | Cho .................... G09G 3/3666 |
| 2019/0121735 A1* | 4/2019 | Hamaker ................ G06T 1/60 |
| 2019/0384560 A1* | 12/2019 | Seo ...................... G09F 9/3026 |
| 2020/0004492 A1 | 1/2020 | Kim |
| 2020/0356333 A1* | 11/2020 | Jeacocke .............. G06F 3/1446 |
| 2021/0202676 A1* | 7/2021 | Jeong .................... H10K 59/10 |
| 2022/0188059 A1 | 6/2022 | Kim |
| 2022/0277679 A1* | 9/2022 | Lee ........................ G09G 3/32 |
| 2024/0152308 A1* | 5/2024 | Kim ..................... G06F 3/1446 |

FOREIGN PATENT DOCUMENTS

| | | |
|---|---|---|
| CN | 103544916 A | 1/2014 |
| EP | 3 761 163 A1 | 1/2021 |
| JP | 2014-85422 A | 5/2014 |
| JP | 2015-200701 A | 11/2015 |
| JP | 2017-207580 A | 11/2017 |
| KR | 10-2006-0083302 A | 7/2006 |
| KR | 10-2008-0044038 A | 5/2008 |
| KR | 10-2009-0124006 A | 12/2009 |
| KR | 10-1376211 B1 | 3/2014 |
| KR | 10-1987186 B1 | 6/2019 |
| KR | 10-2020-0003599 A | 1/2020 |
| KR | 10-2095164 B1 | 3/2020 |
| KR | 10-2020-0121182 A | 10/2020 |

OTHER PUBLICATIONS

Written Opinion (PCT/ISA/237) issued on Sep. 30, 2022 by the International Searching Authority in International Patent Application No. PCT/KR2022/009609.

Communication issued Jul. 2, 2025 by the Korean Intellectual Property Office in Korean Patent Application No. 10-2021-0116176.

Communication issued Jul. 16, 2025 by the European Patent Office for EP Patent Application No. 22864843.2.

Extended European Search Report dated Sep. 16, 2025, issued by the European Patent Office in European Application No. 22864843.2.

* cited by examiner

| IDENTIFIER (3302) | COUNT (3304) | ACTIVE RX (3306) | ACTIVE TX (3308) |
|---|---|---|---|
| 1 | 1 | NA | 1 |
| 1 | 2 | 3 | 4 |
| 1 | 3 | 2 | 3 |
| 1 | 4 | 1 | Master |
| 2 | 1 | NA | 2 |
| 2 | 2 | 4 | 3 |
| 2 | 3 | 1 | 4 |
| 2 | 4 | 2 | Master |
| 3 | 1 | NA | 4 |
| 3 | 2 | 2 | 4 |
| 3 | 3 | 2 | 4 |
| 3 | 4 | 2 | Master |
| 4 | 1 | NA | 4 |
| 4 | 2 | 2 | 4 |
| 4 | 3 | 2 | 3 |
| 4 | 4 | 1 | 3 |
| 4 | 5 | 1 | Master |

| IDENTIFIER (3302) | COUNT (3304) | ACTIVE RX (3306) | ACTIVE TX (3308) |
|---|---|---|---|
| 5 | 1 | NA | 1 |
| 5 | 2 | 3 | 1 |
| 5 | 3 | 3 | 4 |
| 5 | 4 | 2 | 3 |
| 5 | 5 | 1 | 3 |
| 5 | 6 | 1 | Master |
| 6 | 1 | NA | 1 |
| 6 | 2 | 3 | 2 |
| 6 | 3 | 4 | 3 |
| 6 | 4 | 1 | 3 |
| 6 | 5 | 1 | 4 |
| 6 | 6 | 2 | Master |
| 7 | 1 | NA | 4 |
| 7 | 2 | 2 | 3 |
| 7 | 3 | 1 | 2 |
| 7 | 4 | 4 | 3 |
| 7 | 5 | 1 | 4 |
| 7 | 6 | 2 | Master |
| 8 | 1 | NA | 3 |
| 8 | 2 | 1 | 2 |
| 8 | 3 | 4 | 2 |
| 8 | 4 | 1 | 4 |
| 8 | 5 | 2 | 4 |
| 8 | 6 | 2 | Master |

| IDENTIFIER | NUMBER OF MODULES | CONNECTION COUNT | COORDINATES OF PARTIAL IMAGE |
|---|---|---|---|
| 1 | 4 | 1 | [2, 1] |
| | | 2 | [2, 2] |
| | | 3 | [1, 2] |
| | | 4 | [1, 1] |
| 2 | 4 | 1 | [2, 1] |
| | | 2 | [1, 1] |
| | | 3 | [1, 2] |
| | | 4 | [2, 2] |
| 3 | 4 | 1 | [4, 1] |
| | | 2 | [3, 1] |
| | | 3 | [2, 1] |
| | | 4 | [1, 1] |
| 4 | 5 | 1 | [3, 1] |
| | | 2 | [3, 2] |
| | | 3 | [3, 3] |
| | | 4 | [2, 3] |
| | | 5 | [1, 3] |

| IDENTIFIER | NUMBER OF MODULES | CONNECTION COUNT | COORDINATES OF PARTIAL IMAGE |
|---|---|---|---|
| 5 | 6 | 1 | [2, 1] |
| | | 2 | [2, 2] |
| | | 3 | [2, 3] |
| | | 4 | [1, 3] |
| | | 5 | [1, 2] |
| | | 6 | [1, 1] |
| 6 | 6 | 1 | [2, 1] |
| | | 2 | [1, 1] |
| | | 3 | [1, 2] |
| | | 4 | [1, 3] |
| | | 5 | [2, 3] |
| | | 6 | [2, 2] |
| 7 | 6 | 1 | [2, 1] |
| | | 2 | [1, 1] |
| | | 3 | [1, 2] |
| | | 4 | [2, 2] |
| | | 5 | [2, 3] |
| | | 6 | [1, 3] |
| 8 | 6 | 1 | [3, 1] |
| | | 2 | [2, 1] |
| | | 3 | [1, 1] |
| | | 4 | [2, 2] |
| | | 5 | [3, 2] |
| | | 6 | [3, 3] |

MULTI-DISPLAY DEVICE AND IMAGE DISPLAY CONTROL METHOD OF SAME

CROSS-REFERENCE TO RELATED APPLICATION

This application is by-pass continuation application of International Application No. PCT/KR2022/009609, filed on Jul. 4, 2022, which based on and claims priority to Korean Patent Application No. 10-2021-0116176, filed on Sep. 1, 2021, in the Korean Intellectual Property Office, the disclosures of which are incorporated by reference herein in their entireties.

BACKGROUND

1. Field

The disclosure relates to a multi-display device, and more particularly, to a method for controlling image display in a multi-display device.

2. Description of Related Art

The use of multi-display devices that configure a large-scale display by arranging a plurality of display modules adjacent to each other is increasing. Multi-display devices have been mainly used for billboards and digital signage installed in outdoor spaces, such as public places, commercial spaces, and building rooftops, but have recently expanded their use to include home displays. To display an entire image (source image), each of the plurality of display modules of the multi-display device operates to sequentially receive source image signals and select and display a partial image associated with the corresponding display module from the source image signals.

SUMMARY

Display modules of a multi-display device may be sequentially connected in various connection configurations (e.g., various arrangements and orders). The connection configuration between display modules may vary, and the relative position of each display module may change depending on each connection configuration, and the position (or coordinates) of a partial image of the entire image to be displayed may vary as well.

According to one or more embodiments, a multi-display device is configured such that the display modules of the multi-display device are sequentially connected according to a variable connection configuration, automatically select the positions of the corresponding partial images from an entire image signal, and display the partial images on the correct display modules without changing or adjusting settings by the user's intervention.

According to one or more embodiments, a multi-display device may include a plurality of display modules sequentially connected according to a predetermined connection configuration, and the display module may include a signal input unit configured to obtain an image signal and control information and a partial image selection unit configured to obtain information about the predetermined connection configuration of the plurality of display modules from the control information, wherein the display module selects a partial image corresponding to the display module from the image signal by referring to a first lookup table based on the information about the predetermined connection configuration of the plurality of display modules.

The first lookup table may include an identifier of the predetermined connection configuration of the plurality of display modules, information about a number of the plurality of display modules, and position information about a partial image to be displayed by respective ones of the plurality of display modules.

The control information obtained by the display module may further include sequence information about the display module on the predetermined connection configuration of the plurality of display modules, wherein the display module is configured to refer to the first lookup table based on the sequence information.

The control information may be obtained as a header of the image signal through an image signal channel or obtained through a control channel separate from the image signal channel.

The multi-display device may further include a control information generation unit configured to receive sequence information through a backward signal transmission channel opposite to a forward direction in which the image signal is transferred to the plurality of display modules and generate the control information based on the received sequence information.

The display module may further include two or more divided areas, and a transmission port and a reception port arranged in each divided area and having identification information about the corresponding divided area, wherein the sequence information includes the identification information about the transmission port and the reception port which are in an active state on the backward signal transmission channel, wherein the control information generation unit is further configured to generate the control information by referring to a second lookup table based on the received identification information.

The display module may have a rectangular shape, wherein the divided area includes four quadrant areas generated by dividing the rectangular shape by two diagonal lines, wherein the identification information about the transmission port and the reception port includes quadrant information about where the transmission port and the reception port are positioned.

The control information may include an identifier of the predetermined connection configuration of the plurality of display modules, the information about a number of display modules, and a counter initially set to 1, wherein the display module further includes a signal providing unit configured to increase the counter by 1 and transmit the control information to a next display module according to the predetermined connection configuration of the plurality of display modules.

According to one or more embodiments, a method for controlling an image display on each display module in a multi-display device including a plurality of display modules sequentially connected according to a predetermined connection configuration of the plurality of display modules may include: obtaining an image signal and control information, obtaining information about the predetermined connection configuration of the plurality of display modules from the control information, and selecting a partial image corresponding to the display module from the image signal by referring to a first lookup table based on the information about the predetermined connection configuration of the plurality of display modules.

The first lookup table in the method may include an identifier of the predetermined connection configuration of the plurality of display modules, information about a number of the plurality of display modules, and position information about a partial image to be displayed by respective ones of the plurality of display modules.

The control information obtained by the display module in the method may be obtained as a header of the image signal through an image signal channel or obtained through a control channel separate from the image signal channel, and the control information further includes sequence information about the display module on the predetermined connection configuration of the plurality of display modules, wherein the display module refers to the first lookup table based on the sequence information about the display module on the predetermined connection configuration of the plurality of display modules.

The method may further include receiving sequence information indicating the predetermined connection configuration of the plurality of display modules through a backward signal transmission channel opposite to a forward direction in which the image signal is transferred to the plurality of display modules, and generating the control information based on the received sequence information.

The display modules in the method may include two or more divided areas and a transmission port and a reception port arranged in the divided area and having identification information about the corresponding divided area, wherein the sequence information includes the identification information about the transmission port and the reception port which are in an active state on the backward signal transmission channel, wherein the control information is generated by referring to a second lookup table based on the received identification information.

Each of the display modules in the method may have a rectangular shape, wherein the divided areas include four quadrant areas generated by dividing the rectangular shape by two diagonal lines, wherein the identification information about the transmission port and the reception port includes quadrant information about where the transmission port and the reception port are positioned.

The control information in the method may include an identifier of the predetermined connection configuration of the plurality of display modules, information about a number of the plurality of the display modules in the connection configuration, and a counter initially set to 1, wherein the method further includes increasing the counter by 1 and transmitting the control information to a next display module according to the connection configuration.

According to one or more embodiments, even when the connection configuration between the plurality of display modules constituting a multi-display device is changed, the changed connection configuration may be automatically identified according to the connection structure between the display modules and signal flow sequence without the need for the user to identify the changed connection configuration and input such information to the multi-display device, and each display module may automatically recognize the position of the corresponding partial image and display the partial image by referring to a prepared lookup table based on the identified connection configuration. Thus, user convenience may be significantly increased.

BRIEF DESCRIPTION OF DRAWINGS

The above and other aspects, features, and advantages of certain embodiments of the present disclosure are more apparent from the following description taken in conjunction with the accompanying drawings, wherein:

FIG. 6 is a view illustrating an example lookup table that may be used to identify a connection configuration between display modules of an example multi-display device as illustrated in FIGS. 4 and 5 according to one or more embodiments;

FIG. 9 is a view illustrating an example lookup table that shows position (coordinate) information about a partial image allocated to each display module in a connection configuration between display modules of an example multi-display device as illustrated in FIGS. 4 and 5 according to one or more embodiments.

DETAILED DESCRIPTION

Figure 1:
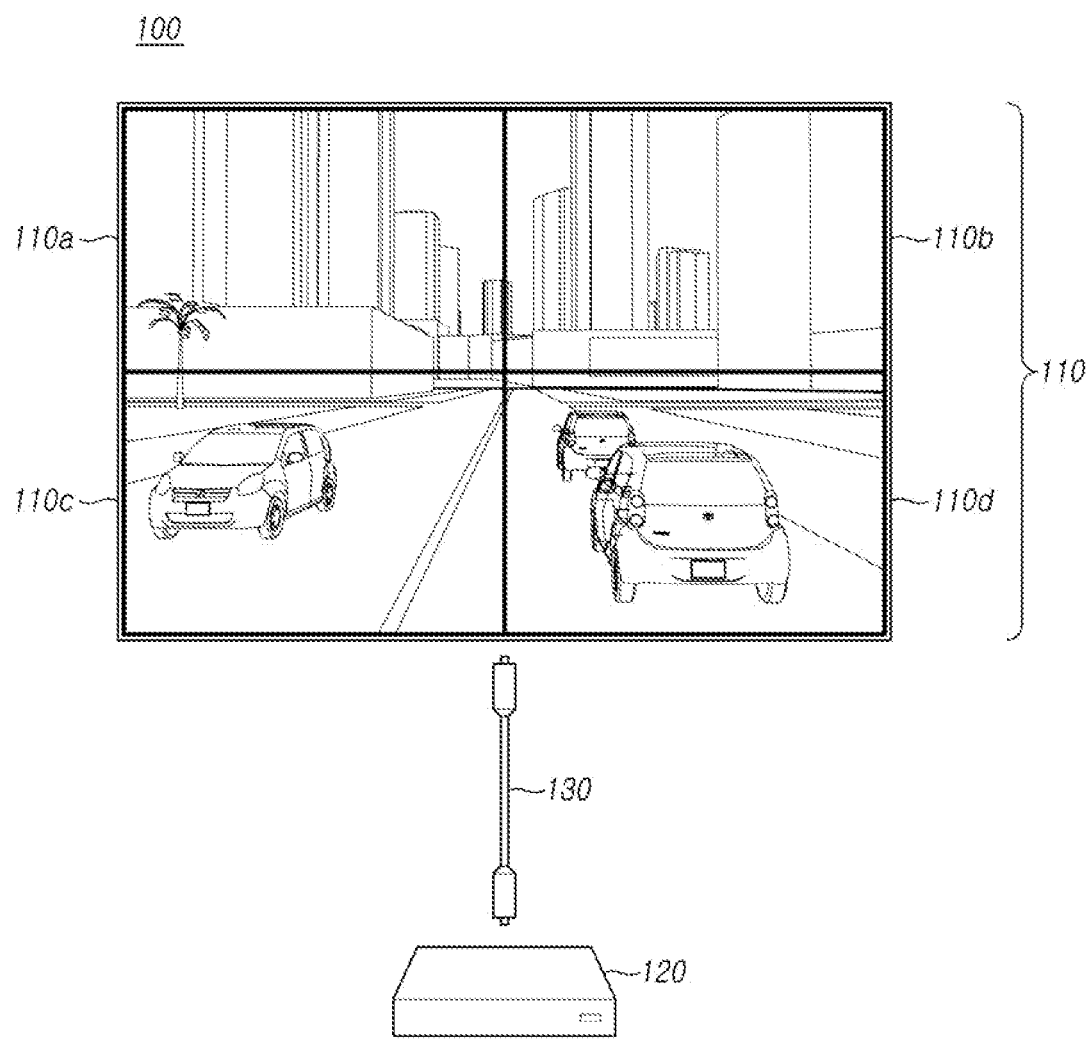
FIG. 1 is a view illustrating a use example of a multi-display system according to one or more embodiments.

Hereinafter, example embodiments are described in detail with reference to the accompanying drawings. In the following description, details, such as configurations and components, are only provided for a better understanding of example embodiments, and the present disclosure is not limited thereto. The same or similar reference denotations may be used to refer to the same or similar elements throughout the specification and the drawings. Further, for clarity and brevity, no description is made of well-known functions and configurations in the drawings and relevant descriptions.

FIG. 1 is a view illustrating a use example of a multi-display system 100 according to one or more embodiments. As illustrated, the multi-display system 100 includes a multi-display device 110, an image source device 120 supplying a source image to be displayed through the multi-display device 110, and a connection cable 130 connecting the image source device 120 and the multi-display device 110. As illustrated, the multi-display device 110 includes a plurality of display modules 110a to 110d.

Referring to FIG. 1, the multi-display device 110 includes four display modules 110a to 110d disposed adjacent to each other to form a matrix of two rows and two columns, but the disclosure is not limited thereto. According to one or more embodiments, a larger or smaller number of display modules may be disposed adjacent to each other to form various matrix forms (e.g., matrix forms in various configurations including an arbitrary number of rows and an arbitrary number of columns) or other various forms to constitute a multi-display device.

Each of the display modules 110a to 110d may include two or more signal transmission/reception ports (each signal transmission/reception port may include a pair of the transmission port TX and the reception port RX). According to one or more embodiments, each of the display modules 110a to 110d may have a rectangular shape and may have four signal transmission/reception ports respectively disposed in areas around the sides of the rectangular shape, but the disclosure is not limited thereto. According to one or more embodiments, the display modules may have circular or other polygonal shapes, and may have signal transmission/reception ports disposed at any position of each display module.

Each of the display modules 110a to 110d, according to one or more embodiments, may be connected to another display module disposed adjacent to the corresponding display module through a signal connection between signal transmission/reception ports disposed closest to each other. By the connection through the signal transmission/reception ports of display modules disposed adjacent to each other, all of the plurality of display modules 110a to 110d may be sequentially connected in series according to an arbitrary order.

According to one or more embodiments, forward and/or backward signal transmission channels may be formed through sequential serial connection between signal transmission/reception ports formed throughout the plurality of display modules 110a to 110d. In the sequential serial connection between the signal transmission/reception ports formed throughout the plurality of display modules 110a to 110d, the foremost display module (e.g., the display module directly connected to the image source device 120 described below) is referred to as a master module, and the rearmost display module is referred to as a final module. According to one or more embodiments, the aforementioned forward signal transmission channel may be formed in a direction from the master module toward the final module, and the backward signal transmission channel may be formed in a direction from the final module toward the master module.

According to one or more embodiments, as described above, a plurality of display modules constituting a multi-display device may be disposed adjacent to each other so as to form various shapes (e.g., an arbitrary matrix shape, a vertical line shape, a horizontal line shape, a stepped shape, or the like, but not limited to a specific shape), and may form an arbitrary serial connection by signal connection between signal transmission/reception ports of the display modules. A connection configuration of a multi-display device may be defined by the arrangement form and connection order between the display modules. According to one or more embodiments, display modules constituting a multi-display device may be connected to each other by one of various connection configurations to form a forward signal transmission channel and/or a backward signal transmission channel.

According to one or more embodiments, a source image signal and/or a forward control signal may be sequentially transmitted from the master module to the final module through the forward signal transmission channel. According to one or more embodiments, in the multi-display device 110 configured according to any one connection configuration, each display module 110a to 110d may receive a source image signal and/or a forward control signal through the forward signal transmission channel, identify a position (or coordinates) of a partial image corresponding to the corresponding display module from the entire source image signal using the received forward control signal, and select and display the corresponding partial image. According to one or more embodiments, as each display module displays a corresponding partial image in this manner, the entire source image may be displayed through all of the display modules.

According to one or more embodiments, the backward control information obtained from each of the display modules 110a to 110d constituting the multi-display device may be sequentially transferred toward the master module through the backward signal transmission channel. According to one or more embodiments, the backward control information transferred through the backward signal transmission channel may include state information (e.g., information about each active signal transmission/reception port) about the backward signal transmission channel or information obtained by a camera or various sensors (e.g., a motion sensor, an illuminance sensor, a temperature/humidity sensor) connected to each display module 110a to 110d, but the disclosure is not limited thereto. Here, it has been described that the above-described backward control information is transferred through the backward signal transmission channel, but the disclosure is not limited thereto.

Referring to FIG. 1, the image source device 120 may be connected to the multi-display device 110 through the connection cable 130. According to one or more embodiments, the image source device 120 may receive a source image signal to be displayed through the entire multi-display device 110 from the outside through a wired or wireless communication method, and may generate such a source image signal by itself. According to one or more embodiments, the image source device 120 may be a media box, a set-top box, or a computer device having other various types of wired or wireless transmission functions, but the disclosure is not limited to a specific type of image source device.

The connection cable 130 may be connected to one of the plurality of display modules 110a to 110d constituting the multi-display device 110, e.g., a master module. According to one or more embodiments, the source image signal may be transmitted from the image source device 120 to the master module through the connection cable 130. The connection cable 130 may be a unidirectional or bidirectional signal transmission cable that supports signal transmission according to an arbitrary protocol between the image source device 120 and the master module. In FIG. 1, it is illustrated that the image source device 120 is connected to the multi-display device 110 by the connection cable 130, but the disclosure is not limited thereto. According to one or more embodiments, the source image signal from the image source device 120 may be transmitted to the multi-display device 110 according to a wireless transmission method without passing through the connection cable 130.

Figure 2:
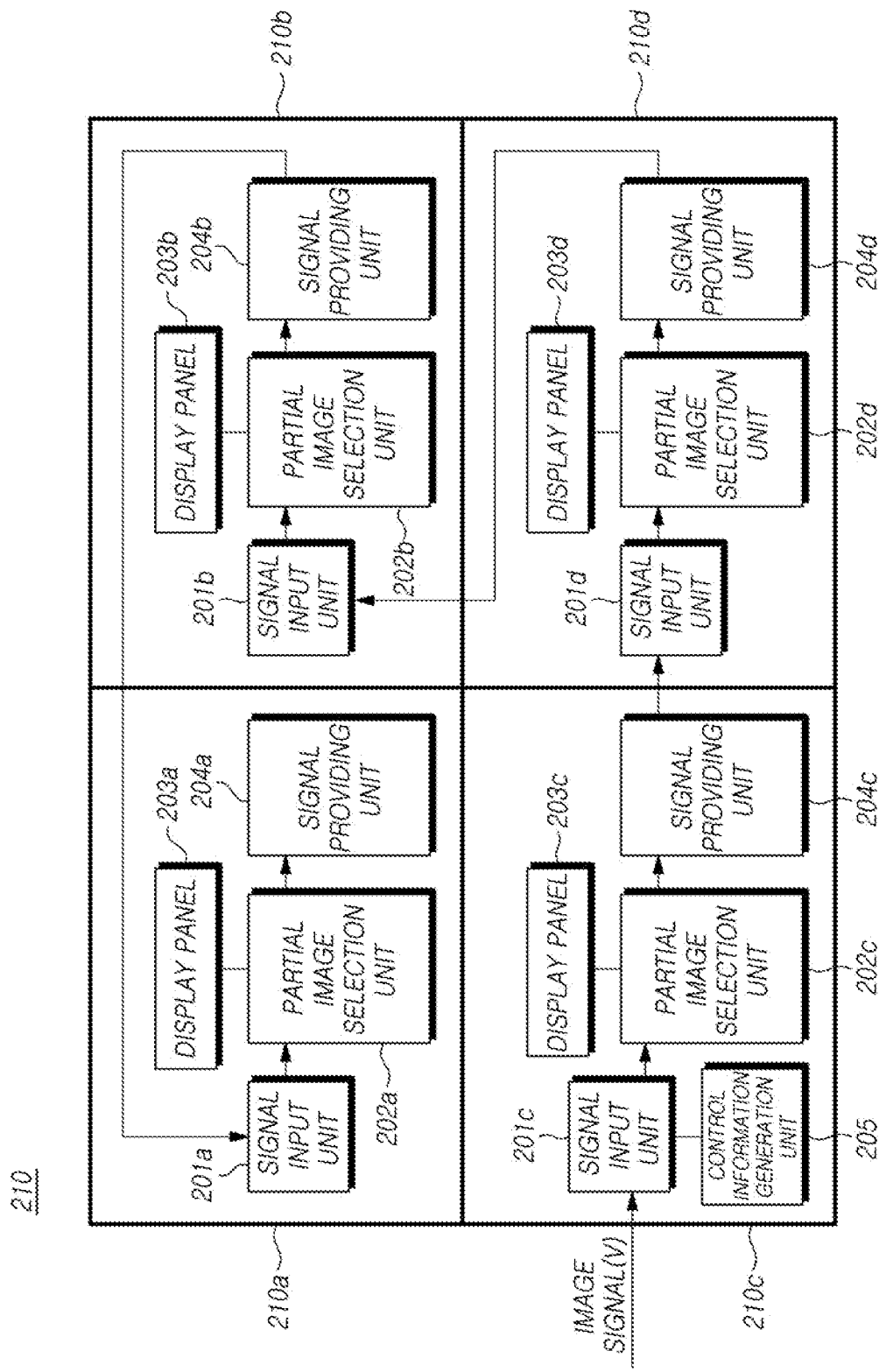
FIG. 2 is a view schematically illustrating a signal flow of a forward signal transmission channel for image display and a functional configuration of each of display modules related to image display, on a multi-display device according to one or more embodiments.

FIG. 2 is a view schematically illustrating a signal flow of a forward signal transmission channel for image display and a functional configuration of each of display modules 210a to 210d related to image display, on a multi-display device 210 according to one or more embodiments.

According to one or more embodiments, similar to the case illustrated in FIG. 1, the multi-display device 210 may include four display modules 210a to 210d disposed adjacent to each other in the form of a matrix of two rows and two columns. According to one or more embodiments, as illustrated, the display module 210c, as a master module, among the four display modules 210a to 210d may receive the image signal V from the outside. As illustrated, a forward signal transmission channel may be formed in the order of the display module 210d, the display module 210b, and the display module 210a from the display module 210c, and the image signal V received from the outside by the display module 210c may be sequentially transferred through the forward signal transmission channel. In this drawing, the signal flow on the forward signal transmission channel is indicated by an arrow. The display modules 210a to 210d of the multi-display device 210 illustrated in FIG. 2 are connected to each other by a predetermined connection configuration, as described above. According to one or more embodiments, another display module among the display modules 210a to 210d may be a master module, or the display modules 210a to 210d may be connected to each other according to a connection configuration different from that illustrated in FIG. 2.

According to one or more embodiments, each of the display modules 210a to 210d may include a signal input unit 201a to 201d for receiving a signal from a previous stage, a partial image selection unit 202a to 202d for selecting a partial image corresponding to the corresponding display module, a display panel 203a to 203d for displaying the selected partial image, and a signal providing unit 204a to 204d for preparing and transmitting a signal to be provided to a rear stage. According to one or more embodiments, as illustrated in FIG. 2, the display module 210c, which is a master module among the display modules 210a to 210d, may further include a control information generation unit 205 for generating control information to be used for displaying a partial image by each of the display modules 210a to 210d.

According to one or more embodiments, each of the signal input units 201a to 201d may receive a signal transmitted from a previous stage. In FIG. 2, as described above, the signal input unit 201c of the display module 210c may receive, e.g., an image signal V from an external image source device 120, and each of the signal input units 201d, 201b, and 201a of the remaining display modules 210d, 210b, and 210a may receive a signal transmitted from the display module of the previous stage. According to one or more embodiments, the signal transferred between the display modules 210a to 210d may include an image signal V to be displayed through each display module 210a to 210d and a control signal to be used for displaying the image. According to one or more embodiments, the signal input unit 201c of the display module 210c, which is the master module, may operate to prepare a signal including the image signal V received from the outside and the control information generated by the control information generation unit 205 and transfer the signal to the rear stage through an interaction with the control information generation unit 205 to be described below.

According to an one or more embodiments, the control information generation unit 205 included in the display module 210c, which is the master module, may generate control information that may be used for each of the display modules 210a to 210d to identify (identify position or coordinates) a corresponding partial image that it is to display from the received image signal V. According to one or more embodiments, the control information generation unit 205 may receive sequence information indicating a connection configuration between the display modules 210a to 210d through a backward signal transmission channel formed between the display modules 210a to 210d. According to one or more embodiments, the control information generation unit 205 may generate the above-described control information based on the sequence information received through the backward signal transmission channel, and the generated control information, together with the image signal V received from the signal input unit 201c, may be transferred to the partial image selection unit 202c. According to one or more embodiments, the control information generated by the control information generation unit 205 may be merged with the image signal V received from the signal input unit 201c, e.g., in the form of header information, and transferred to the rear stage. According to one or more embodiments, the control information generated by the control information generation unit 205 may be transferred to the rear stage as a forward control signal separate from the image signal received from the signal input unit 201c. More details on the generation of control information by the control information generation unit 205 are described below with reference to FIGS. 3 to 6. In this drawing, it is illustrated that only the display module 210c which is the master module among the display modules 210a to 210d of the multi-display device 210 includes the control information generation unit 205, but the disclosure is not limited thereto. According to one or more embodiments, each of the display modules may have a functional configuration corresponding to the control information generation unit 205, and only when the corresponding display module operates as a master module, the control information generation unit 205 on the display module may be activated to interact with the signal input unit 201a on the corresponding master display module.

According to one or more embodiments, each partial image selection unit 202a to 202d may identify the position (or coordinates) of the corresponding partial image to be displayed by the corresponding display module, of the image signal V included in the signal received from each signal input unit 201a to 201d. According to one or more embodiments, the partial image selection unit 202a to 202d may obtain the position (or coordinates) of each corresponding partial image, based on control information included in the received signal, e.g., control information generated and transferred by the above-described control information generation unit 205. According to one or more embodiments, each partial image selection unit 202a to 202d may select a corresponding partial image from the image signal V and transfer the selected partial image to the display panel 203a to 203d on each display module 210a to 210d.

According to one or more embodiments, each of the display panels 203a to 203d may display a predetermined partial image according to an image signal received from each partial image selection unit 202a to 202d. According to one or more embodiments, the display panel 203a to 203d may be various types of display panels such as LED, OLED, micro LED, LCD, mini LED, quantum-dot LED, and the like, but the disclosure is not limited to a specific type.

According to one or more embodiments, each of the signal providing units 204a to 204d may receive a signal from the partial image selection unit 202a to 202d on the corresponding display module 210a to 210d, and may update or process the received signal to generate and provide a signal for the rear-stage display module. According to one or more embodiments, each of the signal providing units 204a to 204d may first determine whether there is a display module at the rear stage to which the signal is to be transferred, based on the control information on the received signal and, when it is determined that there is a display module at the rear stage, update or process the control information on the received signal.

Hereinafter, a process of generating control information by the control information generation unit 205 of FIG. 2 is described in detail with reference to FIGS. 3 to 6, according to one or more embodiments.

Figure 3:
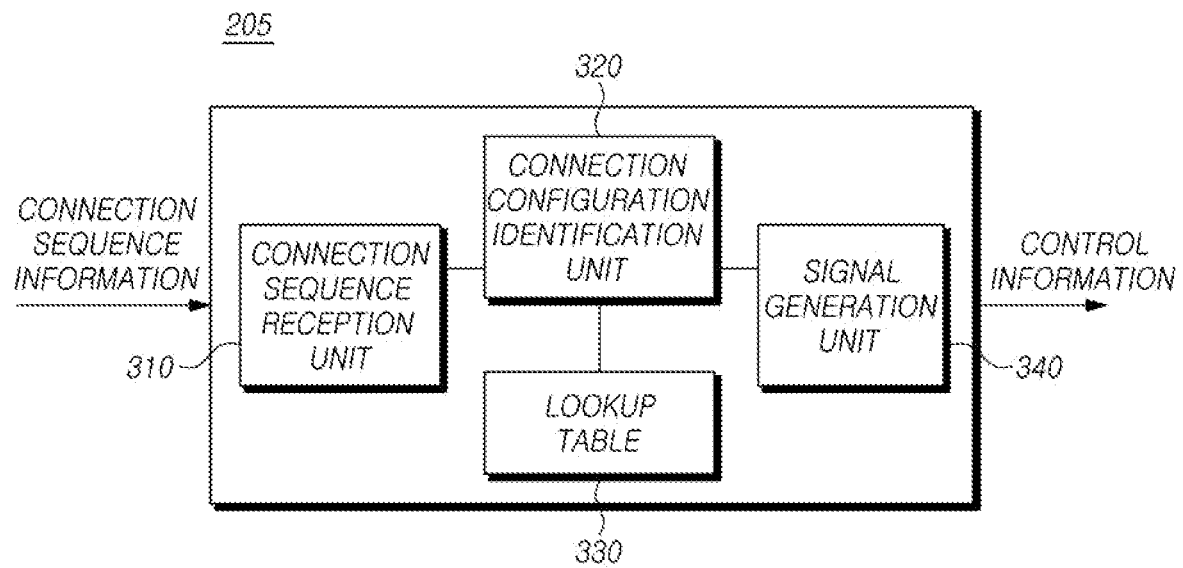
FIG. 3 is a view schematically illustrating a functional configuration of the control information generation unit of FIG. 2 according to one or more embodiments.
Figure 4:
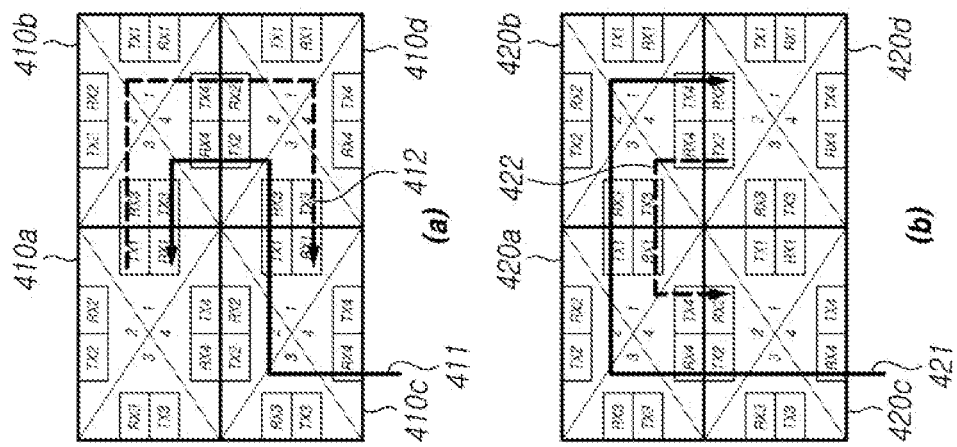
FIG. 4 are views illustrating connection configurations of forward and backward signal transmission channels formed between display modules of an example multi-display device according to one or more embodiments.
Figure 5:
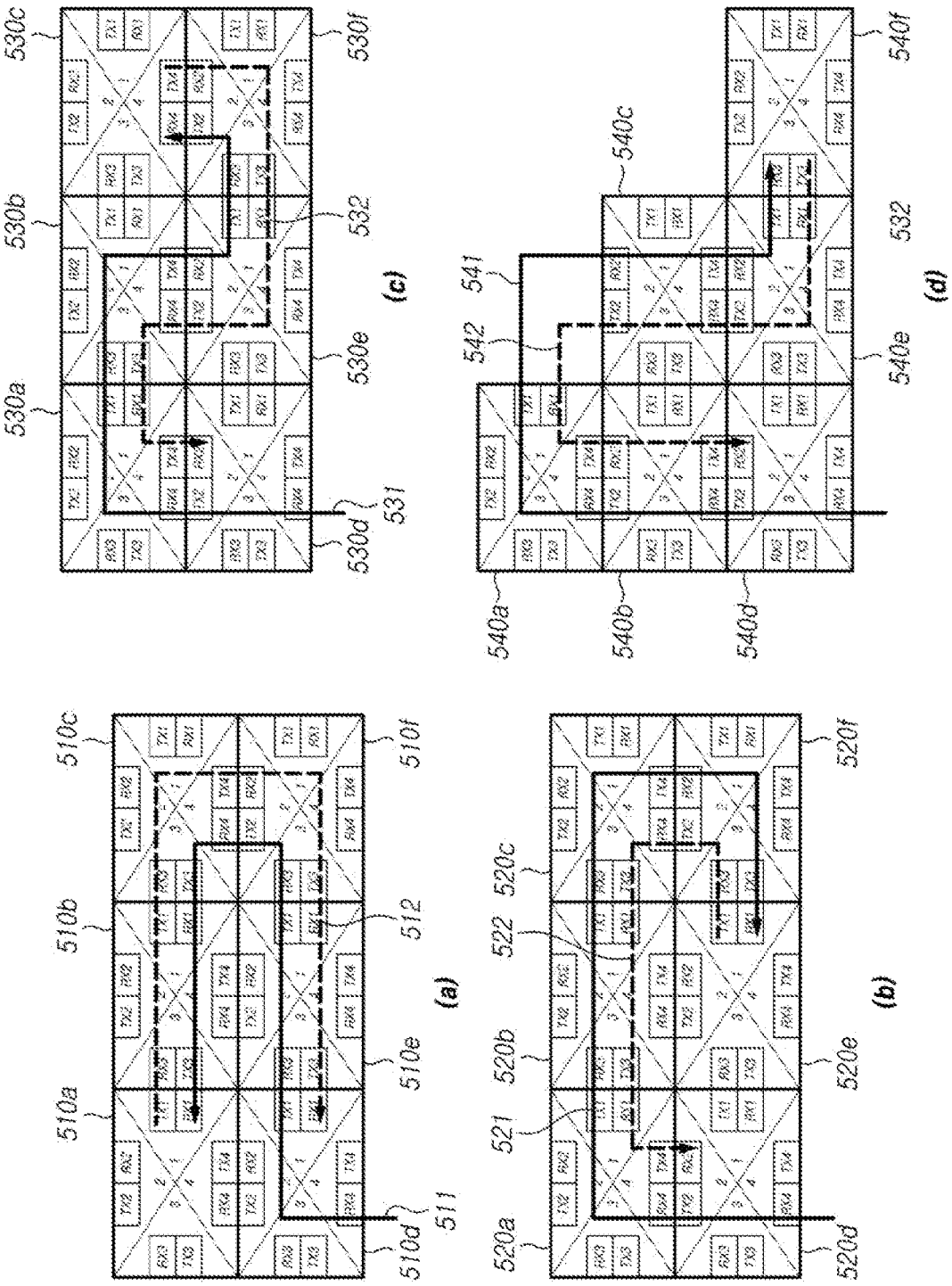
FIG. 5 are views illustrating connection configurations of forward and backward signal transmission channels formed between display modules of an example multi-display device according to one or more embodiments.

FIG. 3 is a view schematically illustrating a functional configuration of the control information generation unit 205 of FIG. 2 according to one or more embodiments. In FIG. 4, (a) to (d) are views illustrating connection configurations of forward and backward signal transmission channels formed between display modules of an example multi-display device according to one or more embodiments. (a) to (d) of FIG. 5 is a view illustrating connection configurations of forward and backward signal transmission channels formed between display modules of an example multi-display device according to one or more embodiments. FIG. 6 is a view illustrating an example lookup table 3300 that may be used to identify a connection configuration between display modules of an example multi-display device as illustrated in FIGS. 4 and 5, as an example of the lookup table 330 of FIG. 3, according to one or more embodiments.

First, referring to FIG. 3, the control information generation unit 205 includes a connection sequence reception unit 310 receiving connection sequence information from the outside, a connection configuration identification unit 320 obtaining an identifier of a connection configuration between display modules, a lookup table 330 used to obtain the identifier of the connection configuration, and a signal generation unit 340 generating control information to be used to display an image signal by the display modules.

According to one or more embodiments, the connection sequence information received by the connection sequence reception unit 310 may be information received through a backward signal transmission channel formed between display modules. According to one or more embodiments, the connection sequence information is sequential information transferred from the final module to the master module through a backward signal transmission channel, and may include signal transmission/reception port information about each display module that is active on the backward signal transmission channel and information about the total number of display modules.

Referring to (a) and (b) of FIG. 4, four display modules 410*a* to 410*d* and 420*a* to 420*d* are arranged in a matrix form of two rows and two columns. Referring to (c) of FIG. 4, four display modules 430*a* to 430*d* are arranged vertically in one column. In (d) of FIG. 4, five display modules 440*a* to 440*e* are arranged in an "L" shape. In each of (a) to (d) of FIG. 4, forward signal transmission channels 411, 421, 431, and 441 in solid arrows and backward signal transmission channels 412, 422, 432, and 442 in dashed arrow are shown.

Referring to (a) to (d) of FIG. 4, the display modules 410*c*, 420*c*, 430*d*, and 440*c* are configured to be master modules of the respective multi-display devices to receive image signals from the outside. Referring to (a) to (d) of FIG. 4, the display modules 410*a*, 420*d*, 430*a*, and 440*a* may be final modules of the respective multi-display devices. In the case (a) of FIG. 4 (corresponding to the case of the display device 210 illustrated in FIG. 2), the forward signal transmission channel 411 is sequentially formed from the display module 410*c* to the display module 410*a* along the counterclockwise direction, and the backward signal transmission channel 412 is formed from the display module 410*a* to the display module 410*c* along the clockwise direction. In the case (b) of FIG. 4, the forward signal transmission channel 421 is sequentially formed from the display module 420*c* to the display module 420*d* along the clockwise direction, and the backward signal transmission channel 422 is formed from the display module 420*d* to the display module 420*c* along the counterclockwise direction. Similarly, in the cases (c) and (d) of FIG. 4, forward signal transmission channels 431 and 441 are sequentially formed from the display modules 430*d* and 440*c*, which are respective master modules, to the display modules 430*a* and 440*a*, which are final modules vertically in the upper direction or in the upper and right direction, and backward signal transmission channels 432 and 442 are formed in the opposite order.

The entire area of each of the display modules 410*a* to 410*d*, 420*a* to 420*d*, 430*a* to 430*d*, and 440*a* to 440*e* illustrated in (a) to (d) of FIG. 4 is divided into four quadrants based on two diagonal lines, and each quadrant is sequentially numbered 1, 2, 3, and 4 along a counterclockwise direction from the right side. Further, as illustrated, each of the display modules 410*a* to 410*d*, 420*a* to 420*d*, 430*a* to 430*d*, and 440*a* to 440*e* may have one pair of transmission port and reception port for each quadrant. A pair of the transmission port TX1 and the reception port RX1 may be disposed in the first quadrant of each of the display modules 410*a* to 410*d*, 420*a* to 420*d*, 430*a* to 430*d*, and 440*a* to 440*e*, a pair of the transmission port TX2 and the reception port RX2 may be disposed in the second quadrant, a pair of the transmission port TX3 and the reception port RX3 may be disposed in the third quadrant, and a pair of the transmission port TX4 and the reception port RX4 may be disposed in the fourth quadrant. Each of the display modules 410*a* to 410*d*, 420*a* to 420*d*, 430*a* to 430*d*, and 440*a* to 440*e* may be connected to adjacent display modules through signal connection between signal transmission/reception ports disposed close to each other. For example, as illustrated in (a) of FIG. 4, between the display module 410*c* and the display module 410*d*, the transmission port TX1 and the reception port RX1 of the display module 410*c* may be connected to the reception port RX3 and the transmission port TX3, respectively, of the display module 410*d* to connect both the display modules. Further, between the display module 410*d* and the display module 410*b*, the transmission port TX2 and the reception port RX2 of the display module 410*d* may be connected to the reception port RX4 and the transmission port TX4, respectively, of the display module 410*b* to connect both the display modules. As illustrated in (a) to (d) of FIG. 4, it may be seen that the other adjacent display modules are connected to each other between their respective adjacent transmission ports and reception ports, and no further description thereof is given.

(a) to (d) of FIG. 5 is a view illustrating connection configurations of forward and backward signal transmission channels formed between display modules of an example multi-display device according to one or more embodiments. For example, in (a) to (c) of FIG. 5, six display modules 510*a* to 510*f*, 520*a* to 520*f*, and 530*a* to 530*f* are arranged in a matrix form of two rows and three columns. In (d) of FIG. 5, the six display modules 540*a* to 540*f* are arranged in the form of stairs going up toward the left upper side. In each of (a) to (d) of FIG. 5, like in the case of FIG. 4, forward signal transmission channels 511, 521, 531, and 541 in solid arrows and backward signal transmission channels 512, 522, 532, and 542 in dashed arrow are shown. As described above with reference to FIG. 4, each display module 510*a* to 510*f*, 520*a* to 520*f*, 530*a* to 530*f*, and 540*a* to 540*f* is divided into four quadrants with respect to both diagonal lines, and adjacent display modules are connected to each other through signal connection between signal transmission/reception ports disposed close to each other, and a detailed description thereof will be omitted herein.

In FIGS. 4 and 5, it is illustrated that each display module 410a to 410d, 420a to 420d, 430a to 430d, 440a to 440e, 510a to 510f, 520a to 520f, 530a to 530f, and 540a to 540f has a rectangular shape, and a corresponding pair of transmission port and reception port is disposed along each corner in each of the quadrants obtained by dividing the rectangular shape with respect to the diagonal lines, but the disclosure is not limited thereto. According to one or more embodiments, the display modules may have a circular shape or another polygonal shape rather than a rectangular shape, and a plurality of transmission port-reception port pairs disposed in each display module may be disposed at predetermined positions, respectively.

Referring back to FIG. 3, as described above, the connection sequence reception unit 310 may receive information about the number of display modules and connection transmission/reception port information, e.g., active transmission/reception port information sequentially for each display module, through a backward signal transmission channel. For example, in (a) of FIG. 4, the connection sequence reception unit of the display module 410c, which is the master module, may receive sequence information (e.g., (NA, TX1), (RX3, TX4), (RX2, TX3), and (RX1, Master)) about the active reception port-transmission port pair of each display module and information about the number of display modules (e.g., four which corresponds to the number of the reception port-transmission port pairs) on the backward signal transmission channel 412 through the backward signal transmission channel 412. Here, it should be noted that on the backward signal transmission channel, there is no active reception port information about the display module 410a which is the final module (denoted as NA in the above sequence information), and there is no active transmission port information about the display module 410c which is the master module (denoted as Master in the above sequence information).

Similarly, in each of (b) to (d) of FIG. 4 and (a) to (d) of FIG. 5, the sequence information about each active reception port-transmission port pair may be received through each of the backward signal transmission channels 422, 432, 442, 512, 522, 532, and 542 by the connection sequence reception unit of each master module, e.g., the display module 420c, 430d, 440c, 510d, 520d, 530d, or 540d. For example, in (d) of FIG. 5, the connection sequence reception unit of the display module 540d, which is the master module, may receive sequence information (e.g., (NA, TX3), (RX1, TX2), (RX4, TX2), (RX1, TX4), (RX2, TX4), (RX2, Master)) about the active reception port-transmission port pair of each display module and information about the number of display modules (e.g., six which corresponds to the number of the reception port-transmission port pairs) on the backward signal transmission channel 542 through the backward signal transmission channel 542.

Referring back to FIG. 3, according to one or more embodiments, the connection configuration identification unit 320 of FIG. 3 may refer to a lookup table 330 based on information received by the connection sequence reception unit 310, e.g., information about the number of display modules received through the backward signal transmission channel, and sequence information about the pairs of reception port and transmission port in the active state on the backward signal transmission channel. According to one or more embodiments, the connection configuration identification unit 320 may obtain the identifier of the connection configuration between the display modules of the corresponding multi-display device from the lookup table 330.

In this regard, referring to FIG. 6, an example lookup table 3300 that may be used to obtain an identifier of a connection configuration between display modules of each of the example multi-display devices illustrated in FIGS. 4 and 5 is illustrated. As illustrated, the lookup table 3300 includes a plurality of connection configuration identifiers 3302 (identifiers 1 to 8), count values 3304 (a series of numbers from 1 to the number of display modules) defined for the connection configuration identifiers, respectively, and identification information 3306 and 3308 about the active reception port RX and the active transmission port TX for each count value. Here, the count values 3304 may denote the sequential display modules from the final module of the backward signal transmission channel to the master module (e.g., the count value 1 may refer to the final module and the last count value may refer to the master module). In this case, the count value 1, e.g., the value of the active reception port RX corresponding to the final module and the last count value, e.g., the value of the active transmission port TX corresponding to the master module, may not be meaningful information as described above, and are denoted as NA and Master, respectively, in the lookup table 3300 in the drawings.

According to one or more embodiments, in the multi-display device illustrated in (a) of FIG. 4, as described above, the connection sequence reception unit of the display module 410c, which is the master module, may receive sequence information of ((NA, TX1), (RX3, TX4), (RX2, TX3), (RX1, Master)) through the backward signal transmission channel. In this case, the connection configuration identification unit of the display module 410c may refer to the lookup table 3300 based on the information received from the connection sequence reception unit, and identify that the connection configuration of the corresponding multi-display device corresponds to the identifier 1. According to one or more embodiments, in the multi-display device illustrated in (d) of FIG. 5, as described above, the connection sequence reception unit of the display module 540d, which is the master module, may receive sequence information of ((NA, TX3), (RX1, TX2), (RX4, TX2), (RX1, TX4), (RX2, TX4), (RX2, Master)) through the backward signal transmission channel. In this case, the connection configuration identification unit of the display module 540d may refer to the lookup table 3300 and identify that the connection configuration of the corresponding multi-display device corresponds to the identifier 8. Likewise, it may be identified that in each master module of (b) to (d) of FIG. 4 and (a) to (c) of FIG. 5, e.g., the display modules 420c, 430d, 440c, 510d, 520d, and 530d, each connection configuration of the corresponding multi-display device corresponds to the identifiers 2 to 7, respectively.

Referring back to FIG. 3, the signal generation unit 340 may generate control information using the identifier of the connection configuration corresponding to the multi-display device, which is obtained by the connection configuration identification unit 320. According to one or more embodiments, e.g., the control information generated by the signal generation unit 340 may include the identifier of the above-described connection configuration, the number of display modules, and a counter (set to 1 at the time of initial generation).

According to one or more embodiments illustrated in FIGS. 2 and 3, as described above, the signal input unit 201c of the display module 210c, which is the master module, may receive the source image signal V from the outside, and may prepare a signal including the control information generated by the control information generation unit 205 and the image signal V through an interaction with the control information generation unit 205 and transfer the signal to the rear stage (e.g., the partial image selection unit 202*c*). In this regard, FIG. 7 illustrates an example 700 in which control information, as header information 720, generated by a control information generation unit is merged into an image signal V 710 according to an one or more embodiments.

Figure 7:
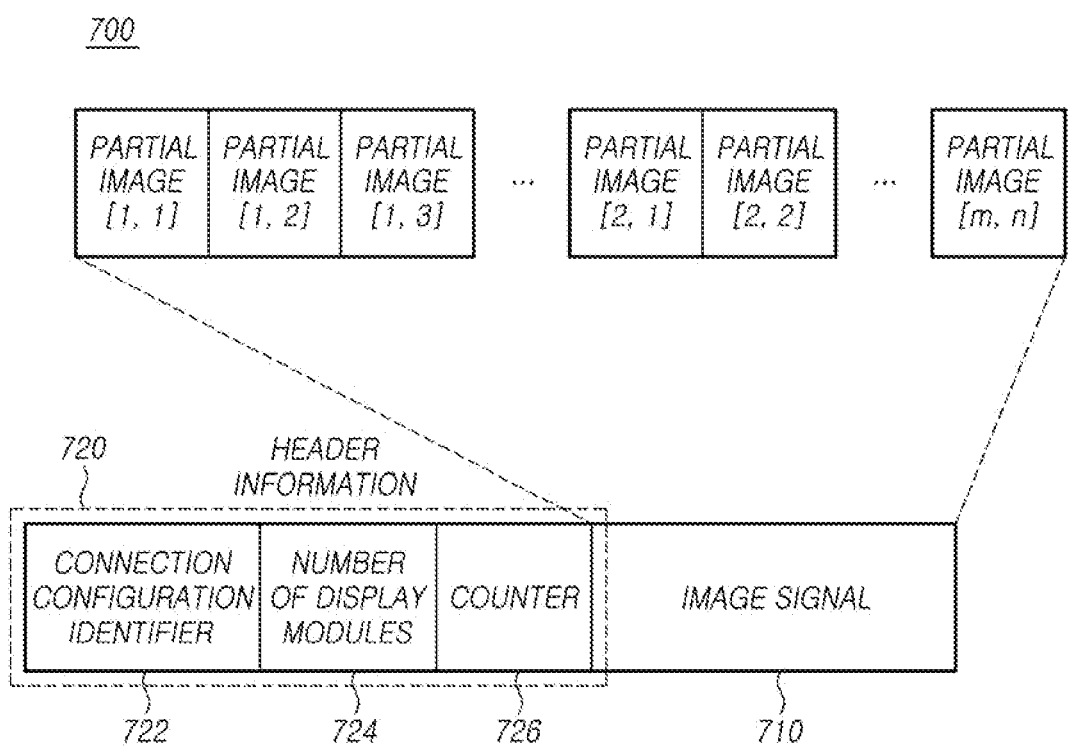
FIG. 7 illustrates an example in which control information generated by a control information generation unit of a master module, as header information, is merged with an image signal to be displayed through display modules according to one or more embodiments.

According to one or more embodiments, as shown in FIG. 7, the source image signal 710 may be pre-divided into a predetermined number of partial images according to a separate protocol, and coordinates may be allocated to each partial image. According to one or more embodiments, the source image signal 710 may be variously divided considering the number and/or arrangement of display modules of the multi-display device, but the disclosure is not limited thereto. According to one or more embodiments, two-dimensional coordinates of [i, j] (i and j are integers equal to or greater than 1) may be assigned to each of a predetermined number of divided partial image signals, considering the position of each partial image signal on the source image signal 710, but the disclosure is not limited thereto. According to one or more embodiments, as shown in FIG. 7, the source image signal 710 may be divided into partial images [1, 1], partial images [1, 2], . . . , and partial images [m, n].

Referring to FIG. 7, the header information 720 includes a connection configuration identifier 722, the number 724 of display modules, and a counter 726 set to 1. According to one or more embodiments, as described above with reference to FIG. 7, the control information generated by the control information generation unit, as header information, may be merged into the image signal V and transferred, but the disclosure is not limited thereto. According to one or more embodiments, the control information may be transferred to the rear stage, as a forward control signal separate from the source image signal V.

Figure 8:
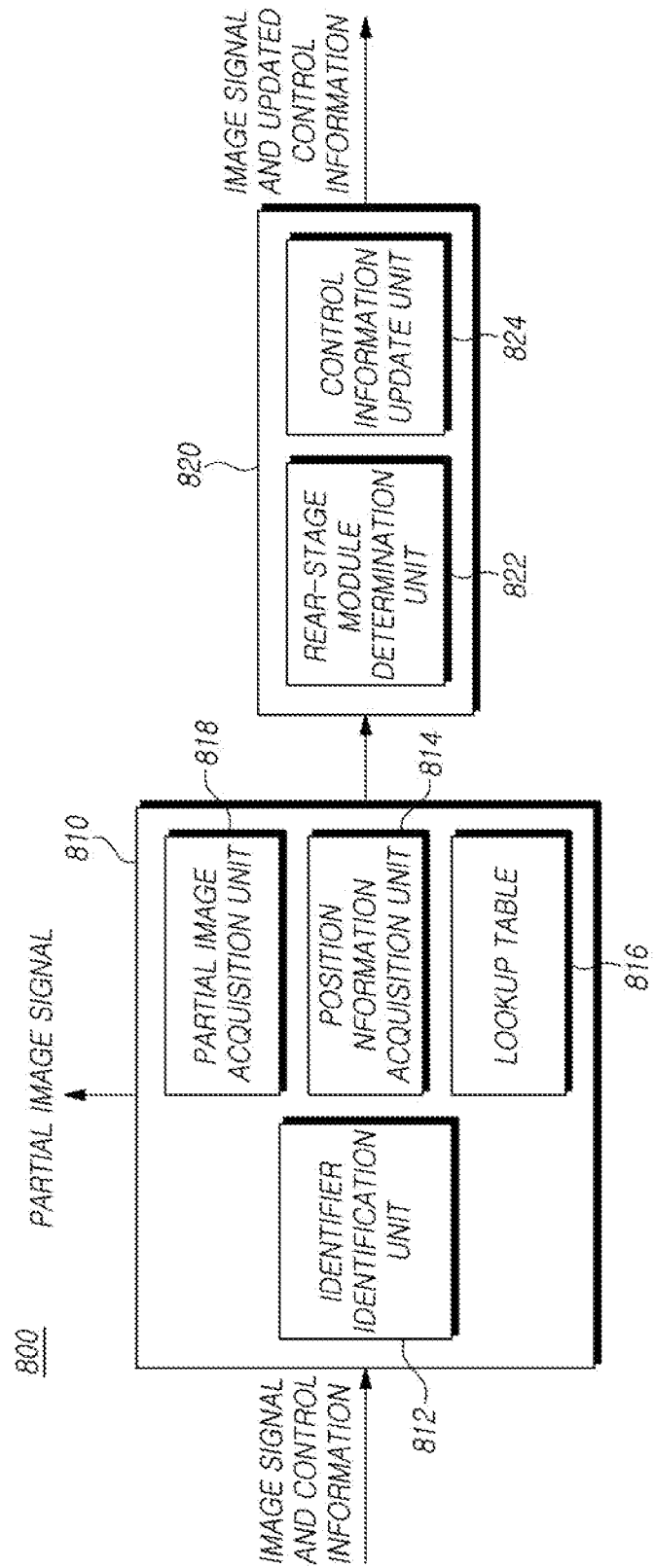
FIG. 8 is a view schematically illustrating a functional configuration of a partial image selection unit and a signal providing unit included in each display module of FIG. 2 according to one or more embodiments.

FIG. 8 is a view schematically illustrating a functional configuration 800 of a partial image selection unit and a signal providing unit included in each display module 210*a* to 210*d* of FIG. 2 according to one or more embodiments.

Referring to FIG. 8, the partial image selection unit 810 may include an identifier identification unit 812, a position information acquisition unit 814, a lookup table 816, and a partial image acquisition unit 818. According to one or more embodiments, the identifier identification unit 812 may receive the above-described image signal V and control information generated by the control information generation unit 205, and may obtain the identifier and the counter of the connection configuration from the received control information. According to one or more embodiments, the position information acquisition unit 814 may refer to the lookup table 816 based on the identifier and the counter of the connection configuration obtained by the identifier identification unit 812, and may obtain position information (e.g., coordinate information) about a corresponding partial image therefrom. According to one or more embodiments, the partial image acquisition unit 818 may obtain a corresponding partial image from the image signal V according to the position information about the partial image obtained by the position information acquisition unit 814. According to one or more embodiments, the partial image signal obtained by the partial image acquisition unit 818 may be transmitted to a corresponding display panel.

Referring to FIG. 8, the signal providing unit 820 includes a rear-stage module determination unit 822 receiving the image signal V and control information from the partial image selection unit 810 at the front stage and determine whether there is a rear-stage module after the corresponding display module (e.g., whether the corresponding display module is the final module) based on the received control information and a control information update unit 824 increasing count information of the control information by 1 when it is determined that there is a rear-stage module by the rear-stage module determination unit 822. According to one or more embodiments, the rear-stage module determination unit 822 may compare the count information on the received control information with the information about the number of the display modules and, when the count information is smaller, determine that there is a rear-stage module. According to one or more embodiments, the signal providing unit 820 may update and/or process signal information to be provided to the display module at the rear stage according to various criteria in addition to the above-described functions.

FIG. 9 is a view illustrating an example lookup table 8160 that shows position (coordinate) information about a partial image allocated to each display module in a connection configuration between display modules of an example multi-display device as illustrated in FIGS. 4 and 5, as an example of the lookup table 816 of FIG. 8, according to one or more embodiments. As illustrated, the lookup table 8160 includes a plurality of connection configuration identifiers 8162 (e.g., identifiers 1 to 8), the number 8164 of display modules defined for each connection configuration identifier, a connection count 8166, and partial image coordinates 8168 to be displayed sequentially according to the count. The lookup table 8160 illustrated in the drawings relates to a case in which two-dimensional coordinates of [i, j] (i and j are integers equal to or greater than 1) are allocated to each partial image considering a position on the entire source image signal, but the disclosure is not limited thereto. For example, the lookup table 8160 illustrated in the present drawing relates to a case in which coordinates of [1, 1], [1, 2], [2, 1], and [2, 2] are allocated to each partial image row-wise from the upper left end based on a position on the source image signal when the source image signal is divided into four in total of two rows and two columns, but the disclosure is not limited thereto.

According to one or more embodiments illustrated in (a) of FIG. 4, as described above with reference to FIG. 6, the control information received by the partial image selection unit of the display module 410*c*, which is the master module, may include information, such as 1 as the identifier of the connection configuration, 4 as the number of display modules, and counter 1. In this case, the identifier identification unit 812 may obtain the connection configuration identifier 1 and the counter 1 from the control information, and the position information acquisition unit 814 may refer to the lookup table 8160 based on the obtained information. For example, the position information acquisition unit 814 may obtain partial image coordinates [2, 1] corresponding to identifier 1 and connection count 1. In this case, the partial image acquisition unit 818 may select a signal of the partial image corresponding to coordinates [2, 1] from the entire source image signal V and transmit the selected signal to the display panel of the display module 410*c*. Then, the rear-stage module determination unit 822 included in the signal providing unit 820 of the display module 410*c* may compare the counter 1 of the control information with the number 4 of the display modules to determine that there is a rear-stage module, and the control information update unit 824 may increase the counter by 1. The image signal V and the updated control signal may be transmitted to the next display module 410*d*. In the partial image selection unit 810 of the display module 410*d*, the identifier identification unit 812 may obtain the connection configuration identifier 1 and the counter 2 from the received control information, and the position information acquisition unit 814 may obtain partial image coordinates [2, 2] by referring to the lookup table 8160 based on the obtained information. The partial image acquisition unit 818 may select a signal of the partial image corresponding to coordinates [2, 2] from the entire source image signal and transmit the selected signal to the display panel of the display module 410*d*. Then, the rear-stage module determination unit 822 included in the signal providing unit 820 of the display module 410*d* may compare the counter 2 of the control information with the number 4 of the display modules to determine that there is a rear-stage module, and the control information update unit 824 may increase the counter by 1 again. In this way, up to the final module 410*a*, each display module of (a) of FIG. 4 may display its respective corresponding partial image, and a description of the rest is omitted. Similarly, in the cases of (b) to (d) of FIG. 4 and (a) to (d) of FIG. 5, each partial image selection unit may obtain coordinates of its respective corresponding partial image with reference to the lookup table 8600, select a partial image corresponding to the coordinates, and transmit the partial image to the display panel.

One or more example embodiments provided herein refer to configurations of (a) to (d) of FIG. 4 and (a) to (d) of FIG. 5, but the disclosure is not limited to these embodiments. According to one or more embodiments, more various numbers of display modules may be disposed in various forms and orders to define more various connection configurations. As described above, when a larger number of various connection configurations are considered, the lookup table 3300 of FIG. 6 may be supplemented and/or updated to be used to obtain an identifier corresponding to each of the various connection configurations. Further, the lookup table 8160 of FIG. 9 may be supplemented and/or updated to be used by each display module to obtain a corresponding partial image position in each of a larger number of various connection configurations according to one or more embodiments.

One or more example embodiments provided herein indicate the control information transferred between the display modules through the forward signal transmission channel of the multi-display device is control information for selecting the partial image of each display module, but the disclosure is not limited thereto. According to one or more embodiments, in addition to the above-described control information for selecting a partial image, many various types of control information may be transferred between display modules.

Functions executed by the multi-display device and each display module described in the disclosure may be implemented by hardware components, software components, and/or combinations of the hardware components and the software components. The software may include computer programs, codes, instructions, or combinations of one or more thereof and may configure or control the operation of the processing device. The software may be implemented as a computer program including instructions stored in computer-readable storage media. The computer-readable storage medium may include, e.g., a magnetic storage medium such as read-only memory (ROM), random-access memory (RAM), a floppy disk, a hard disk, or the like, or an optical storage medium such as a CD-ROM, a digital versatile disc (DVD), or the like. The computer-readable storage medium may be provided in the form of a non-transitory storage medium. Here, the term "non-transitory" indicates the storage medium does not include a signal and is tangible, but this term does not differentiate between where data is more permanently stored in the storage medium and where data is temporarily stored in the storage medium.

According to one or more embodiments, the program may be included and provided in a computer program product. Such computer program products may include software programs or computer-readable storage media storing the software programs. For example, the computer program products may include software program-type products (e.g., downloadable applications ("apps")) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. Alternatively, the computer program product may include the software program itself transmitted from the server to the device or the third device, or transmitted from the third device to the device. In this case, one of the server, the device, and the third device may execute the computer program product to perform the method according to one or more embodiments. Alternatively, two or more of the server, the device, and the third device may execute the computer program product to distributively implement the method according to one or more embodiments. For example, the server may execute the computer program product stored in the server to control the device communicatively connected with the server to perform the method according to one or more embodiments. As another example, the third device may execute the computer program product to control the device communicatively connected to the third device to perform the method according to one or more embodiments. When the third device executes the computer program product, the third device may download the computer program product from the server and execute the downloaded computer program product. Alternatively, the third device may execute the computer program product provided in a pre-loaded state to perform the method according to one or more embodiments.

The terms as used herein are provided to describe example embodiments thereof, but are not intended to limit the disclosure. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

In the disclosure, the above-described description has been made mainly of certain example embodiments, but the disclosure is not limited to such embodiments, but should rather be appreciated as covering all various modifications, equivalents, and/or substitutes of any example embodiment.

What is claimed is:

1. A multi-display device comprising a plurality of display modules sequentially connected according to a predetermined connection configuration of the plurality of display modules, wherein a display module of the plurality of display modules comprises:
   a signal input unit configured to obtain an image signal and control information; and
   a partial image selection unit configured to obtain information about the predetermined connection configuration of the plurality of display modules from the control information,
   wherein the display module selects a partial image corresponding to the display module from the image signal by referring to a first lookup table based on the information about the predetermined connection configuration of the plurality of display modules
   wherein the control information comprises:
      an identifier of the predetermined connection configuration of the plurality of display modules;
      information about a number of the plurality of display modules; and
      a counter initially set to 1, and
   wherein the display module further comprises a signal providing unit configured to:
      increase the counter by 1; and
      transmit the control information to a next display module according to the predetermined connection configuration of the plurality of display modules.

2. The multi-display device of claim 1, wherein the first lookup table comprises the identifier of the predetermined connection configuration of the plurality of display modules, the information about the number of the plurality of display modules, and position information about a partial image to be displayed by respective ones of the plurality of display modules.

3. The multi-display device of claim 1, wherein the control information obtained by the display module further comprises sequence information about the display module on the predetermined connection configuration of the plurality of display modules, and
   wherein the display module is configured to refer to the first lookup table based on the sequence information.

4. The multi-display device of claim 1, wherein the control information is obtained as a header of the image signal through an image signal channel or obtained through a control channel separate from the image signal channel.

5. The multi-display device of claim 1, further comprising a control information generation unit configured to:
   receive sequence information through a backward signal transmission channel opposite to a forward direction in which the image signal is transferred to the plurality of display modules; and
   generate the control information based on the received sequence information.

6. The multi-display device of claim 5, wherein the display module further comprises:
   two or more divided areas; and
   a transmission port and a reception port arranged in the divided area and having identification information about the divided area,
   wherein the sequence information comprises the identification information about the transmission port and the reception port which are in an active state on the backward signal transmission channel, and
   wherein the control information generation unit is further configured to generate the control information by referring to a second lookup table based on the received identification information.

7. The multi-display device of claim 6, wherein the display module has a rectangular shape,
   wherein the divided area comprises four quadrant areas generated by dividing the rectangular shape by two diagonal lines, and
   wherein the identification information about the transmission port and the reception port comprises quadrant information about where the transmission port and the reception port are positioned.

8. A method for controlling an image display on a display module in a multi-display device including a plurality of display modules sequentially connected according to a predetermined connection configuration of the plurality of display modules, the method comprising:
   obtaining an image signal and control information;
   obtaining information about the predetermined connection configuration of the plurality of display modules from the control information; and
   selecting a partial image corresponding to the display module from the image signal by referring to a first lookup table based on the information about the predetermined connection configuration of the plurality of display modules,
   wherein the control information includes an identifier of the predetermined connection configuration of the plurality of display modules, information about a number of the plurality of display modules, and a counter initially set to 1, and
   wherein the method further comprises:
      increasing the counter by 1; and
      transmitting the control information to a next display module according to the predetermined connection configuration of the plurality of display modules.

9. The method of claim 8, wherein the first lookup table includes the identifier of the predetermined connection configuration of the plurality of display modules, the information about the number of the plurality of display modules, and position information about a partial image to be displayed by respective ones of the plurality of display modules.

10. The method of claim 8, wherein the control information obtained by the display module is obtained as a header of the image signal through an image signal channel or obtained through a control channel separate from the image signal channel, further includes sequence information about the display module on the connection configuration, and
    wherein the display module refers to the first lookup table based on the sequence information about the display module on the predetermined connection configuration of the plurality of display modules.

11. The method of claim 8, further comprising:
    receiving sequence information indicating the predetermined connection configuration of the plurality of display modules through a backward signal transmission channel opposite to a forward direction in which the image signal is transferred to the plurality of display modules; and
    generating the control information based on the received sequence information.

12. The method of claim 11, wherein the display module includes two or more divided areas, and a transmission port and a reception port arranged in the divided area and having identification information about the corresponding divided area,
- wherein the sequence information includes the identification information about the transmission port and the reception port which are in an active state on the backward signal transmission channel, and
- wherein the control information is generated by referring to a second lookup table based on the received identification information.

13. The method of claim 12, wherein each of the plurality of display modules has a rectangular shape,
- wherein the divided areas include four quadrant areas generated by dividing the rectangular shape by two diagonal lines, and
- wherein the identification information about the transmission port and the reception port includes quadrant information about where the transmission port and the reception port are positioned.

* * * * *